(12) United States Patent
Ray et al.

(10) Patent No.: US 11,787,940 B2
(45) Date of Patent: Oct. 17, 2023

(54) NYLON TERPOLYMERS

(71) Applicant: Ascend Performance Materials Operations LLC, Houston, TX (US)

(72) Inventors: Jacob G Ray, Pace, FL (US); Douglas Hoffman, Pensacola Beach, FL (US); Scott E. Powers, Rockford, MI (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 17/835,258

(22) Filed: Jun. 8, 2022

(65) Prior Publication Data

US 2022/0325103 A1 Oct. 13, 2022

Related U.S. Application Data

(63) Continuation of application No. 16/525,121, filed on Jul. 29, 2019, now Pat. No. 11,384,242.

(60) Provisional application No. 62/711,647, filed on Jul. 30, 2018.

(51) Int. Cl.
C08L 77/06 (2006.01)
C08G 69/14 (2006.01)
C08L 77/02 (2006.01)
C08G 69/26 (2006.01)

(52) U.S. Cl.
CPC .............. C08L 77/06 (2013.01); C08G 69/14 (2013.01); C08G 69/265 (2013.01); C08L 77/02 (2013.01); C08L 2203/16 (2013.01); C08L 2205/02 (2013.01)

(58) Field of Classification Search
CPC ...... C08G 69/26; C08G 69/265; C08G 69/32; C08L 77/06; B32B 27/34
See application file for complete search history.

(56) References Cited

U.S. PATENT DOCUMENTS

| | | | |
|---|---|---|---|
| 4,076,664 A | | 2/1978 | Pagilagan |
| 4,702,875 A * | | 10/1987 | Jennings ............... D01D 5/253 264/177.17 |
| 5,290,850 A * | | 3/1994 | Shridharani ........... C08G 69/36 8/497 |
| 5,422,420 A * | | 6/1995 | Shridharani ............. D01F 6/80 528/331 |
| 7,780,354 B2 | | 8/2010 | Funaki et al. |
| 9,452,592 B2 | | 9/2016 | Beckwith et al. |
| 2012/0108128 A1 | | 5/2012 | Elia et al. |
| 2017/0144416 A1 | | 5/2017 | Broadus et al. |
| 2018/0298144 A1 * | | 10/2018 | Ray ...................... C08G 69/265 |

FOREIGN PATENT DOCUMENTS

| | | |
|---|---|---|
| EP | 0 738 763 A1 | 10/1996 |
| JP | 2010-150533 A | 7/2010 |
| WO | 2017/058857 A1 | 4/2017 |

OTHER PUBLICATIONS

Glasscock et al. "High Performance Polyamides Fulfill Demanding Requirements for Automotive Thermal Management Components", White Paper, Plastics Dupont, (Aug. 10, 2006), pp. 1-9, XP009532787, Retrieved from the Internet: URL:http://citeseerx.ist.psu.edu/viewdoc/summary?doi=10.1.1.549.219.
International Search Report for PCT Patent Application PCT/US2019/043945 dated Oct. 4, 2019, 3 pages.

* cited by examiner

*Primary Examiner* — Ana L. Woodward
(74) *Attorney, Agent, or Firm* — COZEN O'CONNOR

(57) ABSTRACT

A terpolymer composition is described that contains a statistical amount of 50-98 wt % of a first repeating AA-BB comonomer unit; 1-25 wt % of a second repeating AA-BB comonomer unit; and 1-25 wt % of a repeating lactam comonomer unit or 1-25 wt % of a third repeating AA-BB comonomer unit, where the terpolymer composition exhibits a high melting point similar to that of PA66 while also exhibiting a significantly reduced crystallization rate and crystallization temperature.

20 Claims, 6 Drawing Sheets

NYLON TERPOLYMERS

The present application is a continuation application of U.S. patent application Ser. No. 16/525,121, filed Jul. 29, 2019, which is incorporated herein by reference in its entirety, and which claims priority to and filing benefit from U.S. Provisional Patent Application No. 62/711,647, filed on Jul. 30, 2018, and which is incorporated herein by reference in its entirety.

BACKGROUND OF THE INVENTION

Nylon6,6 is widely used for applications employing a myriad of processes which include injection molding, extruding/spinning fibers, profile extrusion, and film extrusion. Its rapid crystallization rate and high temperature performance versus other engineering resins (e.g., PET and Nylon6) provide significant advantages. The high melting point, toughness, stiffness, puncture resistance and oxygen/aroma barrier properties of Nylon6,6 give it a special performance profile that other thermoplastics, including Nylon6, cannot achieve. A significant disadvantage of using Nylon6,6, however, relates to its versatility and flexibility, especially in film extrusion. This is due to the rapid crystallization rate of Nylon6,6 which requires less than ten seconds to achieve full semi-crystallization at 200-220° C. which is then maintained until approximately 100° C. As a result of this rapid crystallization time, which affects both film processing (such as blow up ratios and the ability to orient and to thermoform) and performance (such as limited gloss and low clarity), Nylon6,6 presents challenges to film manufacturers, blow molders and injection molders (if gloss is required in filled articles).

Given the above recognized difficulties associated with processing Nylon6,6, pellet blends of Nylon6,6 and Nylon6 are commonly processed to achieve the high melting points required for the desired applications while also producing an extruded or molded article with improved processability (i.e., slower crystallinity) and aesthetics. However, in the single screw extruder that is typically employed to melt and produce the final article, it is difficult to prepare a homogenous material that exhibits hybrid properties between those of Nylon6,6 and Nylon6. This difficulty has been well documented in the literature, where pellet blending and melting in a single screw extruder undesirably leads to heterogeneity in the final extruded article in the form of two melting points instead of the intended single melting point (M. Kohan, Nylon Plastics Handbook, 1995; K. Marchildon, Macromol. React. Eng. 5, 22-54, 2011). Further, for processes such as blown, multilayer film, the blending of Nylon6 can fail to provide a satisfactory article due to the relatively high crystallization rate of Nylon6. In such cases, manufacturers commonly employ Nylon6-s-66 copolymers (having melting points of 180-200° C.) or amorphous nylon (i.e., PA6,1-s-6,T) to improve processability while maintaining the high degree of crystallinity and melting point associated with Nylon6,6.

Aside from its higher thermal performance, an advantage of Nylon6,6 over Nylon6 is its cleanliness, whereas in contrast, incorporation of Nylon6 into film can result in thermal reversibility, thereby resulting in a significant amount of caprolactam monomer (M. Kohan, Nylon Plastics Handbook, 1995). This outcome is undesirable as extractable monomer levels are known to adversely compromise safety and delay approvals for food contact applications (Food and Drug Administration, HHS, 21 CFR Ch. I, 4-1-02 Edition, 2002). At typical Nylon6 processing temperatures, caprolactam formation relative to the weight of Nylon6 is approximately 7-8 wt %, while in contrast, the present invention exhibits a substantially lower maximum comonomer formation of approximately 1.5 wt %.

Nylon6,6 is commonly used as a substitute for Nylon6 in film applications where higher thermal performance and improved strength are required. However, Nylon6 and Nylon 6-rich copolyamides cover a majority of the 1.3 billion pound nylon market mainly due to their ease of processing (i.e., a slower crystallization rate which improves stretching and thermoforming properties) and thermal and rheological compatibility with other thermoplastics used in producing multilayer extrusion. Nylon6,6-rich copolymers described in the conventional art (e.g., WO 2017/058857) satisfy many requirements in regard to processability and performance. By comparison, a Nylon6,6-based terpolymer of the present invention (such as PA6,6-6-6,I) provide added functionality because they desirably exhibit melting points greater than or equal to that of a Nylon6,6 copolymer while reducing the crystallization rates and temperatures. This phenomenon ultimately and unexpectedly leads to (1) increased advanced clarity/gloss, (2) a broader processing window for multiple applications (e.g., multi-bubble oriented film, blow molding, rotary molding) and (3) a higher elongation (i.e., allows for higher draw ratios in thermoforming).

Film is a primary target application area where the benefits are observed based on the aforementioned advantages that are enabled by slower crystallization behavior. Key target areas include industrial or food applications that require monolayer or multilayer packages. Examples of uses of such a monolayer film include, but are not limited to, vacuum bagging/protective films for curing composite structures (e.g., windmill blades for wind energy), cooking bags, and biaxially oriented nylon which appears in a multilayer laminate structure for items such as coffee packaging and retort pouches. Examples of uses of such a multilayer blown film include, but are not limited to, meat and cheese packaging and stand-up pouches, and shrink films for bone-in meats. In addition, slower crystallization, which results in enhanced gloss, clarity, and toughness, finds benefit in, for example, monofilament (e.g., fishing line), fibers, and improving surface finish/gloss in filled injection molded articles.

The present invention addresses unmet commercial needs by providing access to terpolymers that exhibit an unexpectedly unique combination of thermal, mechanical, and crystallization properties that are not otherwise achievable with Nylon6, Nylon6,6, Nylon6-rich copolyamides, or Nylon6,6-rich copolyamide solutions, and melt blends thereof, especially when the invention is directed to applications such as cast and blown film or filled, injection molded articles. It has been discovered that incorporation of two additional monomers into a Nylon6,6 system resulted in a terpolymer (such as Nylon6,6-s-6-s-6,I) that unexpectedly exhibited additional benefits compared to a Nylon6,6-copolymer such as an even broader processing window (a significant advantage for film and blow molding applications), enhanced melt strength that enables high throughput/blow up ratios, an ability to stretch or thermo-film film with ease, improved compatibility/processing ease in a multilayer film and higher gloss surfaces (beneficial for injection molding and film applications). Thus, the terpolymers of the present invention provide ready access to materials with properties that are between greater than or equal to those of Nylon6 and approaching Nylon6,6 and with crystallization rates slow enough to satisfy the process and performance demands of the articles prepared therefrom. In addition to the processing benefits, the terpolymers of the present invention also exhibit other desirable properties such as high elongation to break, puncture/impact toughness, tear strength, lower moisture absorption and enhanced oxygen/aroma barrier.

Valued attributes of the terpolymers of the present invention include high melting points (>220° C.), high toughness, a reduced crystallization rate, relative viscosities in the range of 40<RV<350) and/or molecular weights in the range of 14,000 g/mol<$M_n$<64,000 g/mol to meet the needs of each process/application. The reduced crystallization rates of the terpolymers coupled with these advantageous mechanical and thermal properties result in high film transparency (where the combination of temperature and aesthetics is of particular interest as the outer layers in multi-layer packages promote good consumer package appeal while also providing food packagers with ideal heat sealing characteristics), higher blow up ratios, increased thermoformability and the ability to uni- or bi-axially orient. Notably, a Nylon6,6-rich terpolymer of the present invention was observed to yield the slowest crystallization rates at target melting points between 220 and 255° C. which enable attributes such as heat resistance with high aesthetics and toughness in the end use application.

SUMMARY OF THE INVENTION

An aspect of the present invention relates to a statistical terpolymer thermoplastic composition prepared from combinations of (i) dicarboxylic acid (diacid)/diamine comonomer repeating units and (iii) lactam comonomer repeating units to provide three distinct sets of repeating units. In an exemplary embodiment, the terpolymer composition comprises (or alternatively, consists of) 50 to 98 wt % of Nylon6,6 from an adipic acid and hexamethylene diamine comonomer repeating unit; and 2 to 50 wt % total of two additional repeating comonomer units selected from a different dicarboxylic acid and diamine repeating unit (an "AA-BB" unit) and a lactam monomer repeating unit (an "AB" unit). In a particular embodiment, the terpolymer composition comprises (or alternatively, consists of) Nylon6,6 and two other AA-BB units, where the two other AA-BB units are different from each other and from the Nylon6,6. In another particular embodiment, the terpolymer composition comprises (or alternatively, consists of) Nylon6,6, an AA-BB unit and an AB unit where the AA-BB unit is different from the Nylon6,6. In another particular embodiment, the terpolymer composition comprises (or alternatively, consists of) Nylon6,6 and two AB units, where the two AB units are different from each other.

In a particular embodiment, the terpolymer composition comprises 50-98 wt % of a first repeating AA-BB comonomer unit; 1-25 wt % of a second repeating AA-BB comonomer unit; and 1-25 wt % of a repeating lactam comonomer unit or 1-25 wt % of a third repeating AA-BB unit, where the first, second and third repeating AA-BB comonomer units are all different. In a particular embodiment, this terpolymer composition has a relative viscosity according to ASTM D789 (9.34) of 45 to 350 and a melting point greater than 215° C.

In another particular embodiment, the terpolymer composition comprises 50-98 wt % of a first repeating AA-BB comonomer unit; 1-25 wt % of a second repeating AA-BB comonomer unit; and 1-25 wt % of a repeating lactam comonomer unit, where the first and second repeating AA-BB comonomer units are different. In a particular embodiment, this terpolymer composition has a relative viscosity according to ASTM D789 (9.34) of 45 to 350 and a melting point greater than 215° C.

In another particular embodiment, the terpolymer composition comprises 50-98 wt % of a first repeating AA-BB comonomer unit; 1-25 wt % of a second repeating AA-BB comonomer unit; and 1-25 wt % of a third repeating AA-BB comonomer unit, where the first, second and third repeating AA-BB comonomer units are all different. In a particular embodiment, this terpolymer composition has a relative viscosity according to ASTM D789 (9.34) of 45 to 350 and a melting point greater than 215° C.

In another particular embodiment, the terpolymer composition comprises 50-98 wt % of a first repeating AA-BB comonomer unit; 1-25 wt % of a first repeating lactam comonomer unit; and 1-25 wt % of a second repeating lactam comonomer unit, where the first and second repeating lactam comonomer units are different. In a particular embodiment, this terpolymer composition has a relative viscosity according to ASTM D789 (9.34) of 45 to 350 and a melting point greater than 215° C.

In a particular embodiment, the terpolymer comprises (or alternatively, consists of) a Nylon6,6 comonomer repeating unit, a caprolactam comonomer repeating unit and a non-linear AA-BB comonomer repeating unit prepared from hexamethylene diamine and isophthalic acid, which allows for incorporation of PA6 and PA6,I (where I is isophthalic acid), respectively, into the PA66-rich terpolymer composition. Thus, in a particular embodiment, the terpolymer composition is a combination of PA66 units, PA6 units and PA6,I units in a statistical terpolymer represented by the structural formula PA66-s-6-s-6,I. In another particular embodiment, the terpolymer composition is a combination of PA66 units, PA6 units and PA6,9 units in a statistical terpolymer represented by the structural formula PA66-s-6-s-6,9.

In other particular embodiments of the invention, the AA-BB comonomer unit is separately PA6,9; PA6,10; or PA6,I such that in particular embodiments, the terpolymer composition includes a combination of PA66 units and PA6,9 units in a statistical copolymer that is PA66-s-6,9; a combination of PA66 units and PA6,10 units in a statistical copolymer that is PA66-s-6,10; a combination of PA66 units and PA6,I units in a statistical copolymer that is PA6,6-s-6,I; a combination of PA6,9 units and PA6,10 units in a statistical copolymer that is PA6,9-s-6,10; or a combination of PA6,9 units or PA6,10 units with PA6,I units in a statistical copolymer that is PA6,9-s-PA6,I or PA6,10-s-6,I, respectively. In other particular embodiments, the terpolymer composition includes a combination of PA66-s-6,12; PA66-s-6,18; PA66-s-9,6; PA66-s-10,6; PA6,9-s-6,12; PA6,9-s-6,18; PA6,9-s-9,6; or PA6,9-10,6.

In an exemplary embodiment, the terpolymer composition comprises (or alternatively, consists of) 50 to 98 wt % (such as 60 to 95 wt %, such as 65 to 90 wt %, such as 70 to 90 wt %) of a diamine/dicarboxylic acid comonomer repeating unit and 1 to 25 wt % (such as 1 to 20 wt %, such as 5 to 20 wt %, such as 10 to 20 wt %) of each of the lactam and/or different AA-BB comonomer repeating units. In another exemplary embodiment, the terpolymer composition comprises (or alternatively, consists of) 66 to 99 mol % (such as 70 to 95 mol %, such as 70 to 90 mol %, such as 75 to 90 mol %) of a diamine/dicarboxylic acid repeating comonomer unit and 1 to 34 mol % total (such as 1 to 30 mol %, such as 1 to 25 mol %, such as 5 to 25 mol %, such as 10 to 25 mol %) of the lactam and/or different AA-BB repeating comonomer units.

In another exemplary embodiment, the terpolymer composition comprises (or alternatively, consists of) 70 to 99 wt % from hexamethylene diamine and adipic acid (PA66) repeating units and 1 to 30 wt % total of lactam repeating units and/or different AA-BB repeating units. In a particular embodiment, the terpolymer composition is PA66-s-6-s-6,I, whereby the presence of the PA6 and PA6,I units in the backbone of the terpolymer results in a high melting point of 220° C.<Tm<260° C., where the actual melting point depends on the actual amounts of PA66, PA6, and PA6,I units in the terpolymer, while also yielding a significantly reduced crystallization rate that is 3× to 100× slower than that of PA66 and a reduced crystallization temperature of 120° C.<Tc<200° C. This novel approach to the customized preparation of terpolymer compositions of the present invention is driven by the desired properties of the final product. In an exemplary embodiment, the present invention allows for the generation of a high melting point PA66-rich terpolymer with (1) a high gloss surface (especially beneficial for highly filled injection molded parts and for film applications, and where the combination of heat resistance and gloss is ideally suited for use as an outer layer in multi-layer packages to achieve desired heat sealing properties and high consumer package appeal); (2) clarity/haze reduction (valued for molded articles requiring visibility/transparency (e.g., for power steering reservoirs and food packaging films that allow the consumer to clearly see the packaged article); (3) a large processing window for film or blow molding applications (e.g., for high blow up ratios in blown film, for blow molding requiring a large processing time/temperature window and/or ease of film orientation allowing for stretch ratios up to 5×, and/or ease of thermoforming to provide a deep draw); (4) a high elongation to break (e.g., >500% for film and >50% for injection molded, unfilled articles); (5) low moisture absorption and high gas/aroma barrier (beneficial for film applications); and (6) high melt strength (enhances the processing window for film, filament, blow molding, and thermoforming processing).

The combination of a high melting point and a slow crystallization rate/crystallization temperature is further expanded by the terpolymers of the present invention compared to similar copolymer compositions. In various exemplary embodiments, the observed crystallization rate is 50× to 100× slower than PA6 alone. Further, the terpolymers of the invention increase the breadth of the window between melting point and crystallization temperature up to 20° C. or more compared to copolymers of the same melting point. Ultimately, this leads to higher gloss surfaces and provides an even broader processing window for molding and extrusion processes. Regarding processing, the terpolymer compositions unexpectedly allow for the preparation of high gloss multilayer films (e.g., of the structure PA layer/tie resin layer/LLDPE layer/tie resin layer/PA layer/tie resin layer/LLDPE layer) which contain a high melting point polyamide (PA) outside layer ($T_m$>240° C.) when the terpolymer compositions of the present invention replace PA66 or PA66-s-6 copolyamides as the PA layer of such multilayer films. Described herein are injection molding, blow molding, and extruded film examples that provide clear evidence of the superior benefits achieved with the terpolymer compositions as described herein.

Another aspect of the invention is a terpolymer composition comprising 70 to 99 wt % of a repeating diamine and dicarboxylic acid unit; and 1 to 30 wt % total of a repeating lactam unit and a different AA-BB unit, wherein the terpolymer composition has a relative viscosity according to ASTM D789 (9.34) of 45 to 350 and a melting point greater than 220° C.

In two exemplary embodiments, the terpolymer composition of the present invention is represented by Formula (1) or Formula (2) as shown below:

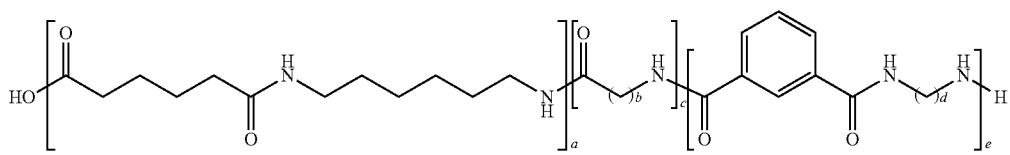

Formula (1)

wherein for Formula (1):
a=50-98 wt %;
b=4-12;
c=1-25 wt %;
d=2-16; and
e=1-25 wt %.

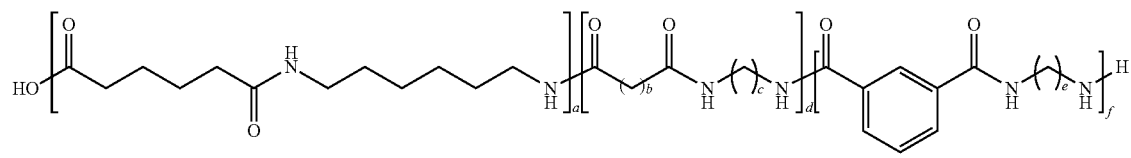

Formula (2)

wherein for Formula (2):
a=50-98 wt %;
b=2-16;
c=2-16;
d=1-25 wt %;
e=2-16; and
f=1-25 wt %.

For Formula (1), the range of "50-98 wt %" for variable "a" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "4-12" for variable "b" includes all ranges in between, such as, but not limited to, 4-11, 4-10, 4-9, 4-8, 4-7, 4-6, 5-12, 5-10, 5-8, 6-12, 6-10, 6-8, 7-12, 7-10, 8-12, 8-10 and 9-12. The range of "1-25 wt %" for variables "c" and "e" independently includes all ranges in between, such as, but not limited to, 1-24 wt %, 1-23 wt %, 1-22 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-24 wt %, 4-20 wt %, 4-18 wt %, 4-16 wt %, 4-14 wt %, 4-12 wt %, 4-10 wt %, 4-8 wt %, 4-6 wt %, 6-24 wt %, 6-20, 6-18 wt %, 6-16 wt %, 6-14 wt %, 6-12 wt %, 6-10 wt %, 6-8 wt %, 8-24 wt %, 8-20 wt %, 8-18 wt %, 8-16 wt %, 8-14 wt %, 8-12 wt %, 8-10 wt %, 10-24 wt %, 10-20 wt %, 10-18 wt %, 10-16 wt %, 10-14 wt %, 10-12 wt %, 12-24 wt %, 12-23 wt %, 12-20 wt %, 12-18 wt %, 12-16 wt %, 12-14 wt %, 14-24 wt %, 14-20 wt %, 14-18 wt %, 14-16 wt %, 16-24 wt %, 16-20 wt %, 16-18 wt %, 18-24 wt %, 18-22 wt % and 20-24 wt %. The range of "2-16" for variable "d" independently includes all ranges in between, such as, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16.

For Formula (2), the range of "50-98 wt %" for variable "a" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "2-16" for variables "b", "c" and "e" independently includes all ranges in between, such as, but not limited to, 2-14, 2-12, 2-10, 2-8, 2-6, 4-16, 4-14, 4-12, 4-10, 4-8, 4-6, 6-16, 6-14, 6-12, 6-10, 8-16, 8-14, 8-12, 10-16, 10-14 and 12-16. The range of "1-25 wt %" for variables "d" and "f" independently includes all ranges in between, such as, but not limited to, 1-23 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-23 wt %, 4-20 wt %, 4-18 wt %, 4-16 wt %, 4-14 wt %, 4-12 wt %, 4-10 wt %, 4-8 wt %, 4-6 wt %, 6-23 wt %, 6-20, 6-18 wt %, 6-16 wt %, 6-14 wt %, 6-10 wt %, 6-8 wt %, 8-23 wt %, 8-20 wt %, 8-18 wt %, 8-16 wt %, 8-14 wt %, 8-12 wt %, 8-10 wt %, 10-23 wt %, 10-20 wt %, 10-18 wt %, 10-16 wt %, 10-14 wt %, 10-12 wt %, 12-25 wt %, 12-23 wt %, 12-20 wt %, 12-18 wt %, 12-16 wt %, 12-14 wt %, 14-23 wt %, 14-20 wt %, 14-18 wt %, 14-16 wt %, 16-23 wt %, 16-20 wt %, 16-18 wt %, 18-24 wt %, 18-22 wt % and 20-24 wt %.

Other exemplary embodiments of the terpolymer compositions of the present invention are shown below:

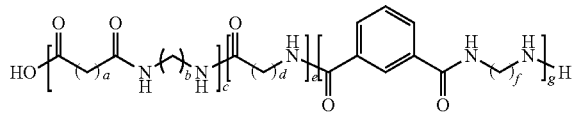

Formula (3)

wherein for Formula (3):

a=2-16;

b=2-16;

c=50-98 wt %;

d=2-16;

e=1-25 wt %;

f=2-16; and g=1-25 wt %.

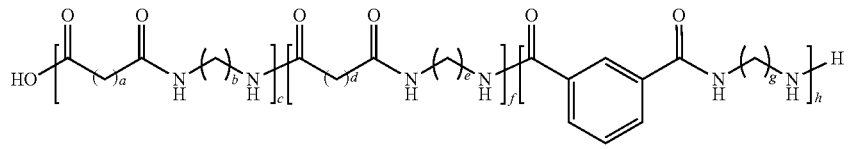

Formula (4)

wherein for Formula (4):

a=2-16;

b=2-16;

c=50-98 wt %;

d=2-16;

e=2-16;

f=1-25 wt %;

g=2-16; and h=1-25 wt %.

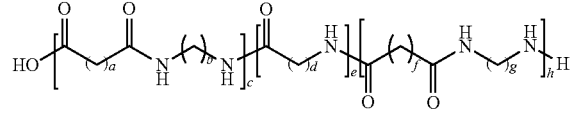

Formula (5)

wherein for Formula (5):

a=2-16;

b=2-16;

c=50-98 wt %;

d=2-16;

e=1-25 wt %;

f=2-16;

g=2-16; and h=1-25 wt %.

Formula (6)

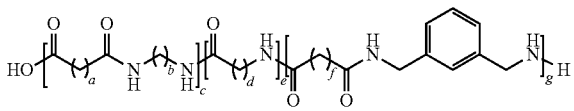

wherein for Formula (6):
a=2-16;
b=2-16;
c=50-98 wt %;
d=2-16;
e=1-25 wt %;
f=2-16; and
g=1-25 wt %.

Formula (7)

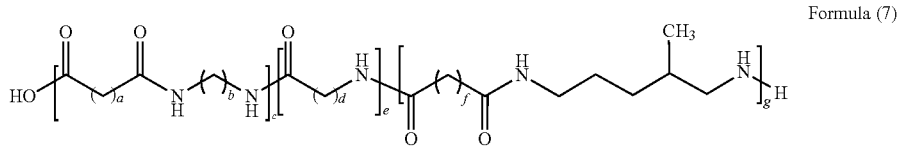

wherein for Formula (7):
a=2-16;
b=2-16;
c=50-98 wt %;
d=2-16;
e=1-25 wt %;
f=2-16; and
g=1-25 wt %.

For Formula (3), the range of "2-16" for variables "a", "b", "d" and "f" independently includes all ranges in between, such as, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16. The range of "50-98 wt %" for variable "c" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "1-25 wt %" for variables "e" and "g" includes all ranges in between, such as, but not limited to, 1-24 wt %, 1-23 wt %, 1-22 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-24 wt %, 4-20 wt %, 4-18 wt %, 4-16 wt %, 4-14 wt %, 4-12 wt %, 4-10 wt %, 4-8 wt %, 4-6 wt %, 6-24 wt %, 6-20, 6-18 wt %, 6-16 wt %, 6-14 wt %, 6-12 wt %, 6-10 wt %, 6-8 wt %, 8-24 wt %, 8-20 wt %, 8-18 wt %, 8-16 wt %, 8-14 wt %, 8-12 wt %, 8-10 wt %, 10-24 wt %, 10-20 wt %, 10-18 wt %, 10-16 wt %, 10-14 wt %, 10-12 wt %, 12-24 wt %, 12-23 wt %, 12-20 wt %, 12-18 wt %, 12-16 wt %, 12-14 wt %, 14-24 wt %, 14-20 wt %, 14-18 wt %, 14-16 wt %, 16-24 wt %, 16-20 wt %, 16-18 wt %, 18-24 wt %, 18-22 wt % and 20-24 wt %.

For Formula (4), the range of "2-16" for variables "a", "b", "d", "e" and "g" independently includes all ranges in between, such as, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16. The range of "50-98 wt %" for variable "c" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "1-25 wt %" for variables "f" and "h" includes all ranges in between, such as, but not limited to, 1-24 wt %, 1-23 wt %, 1-22 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-24 wt %, 4-20 wt %, 4-18 wt %, 4-16 wt %, 4-14 wt %, 4-12 wt %, 4-10 wt %, 4-8 wt %, 4-6 wt %, 6-24 wt %, 6-20, 6-18 wt %, 6-16 wt %, 6-14 wt %, 6-12 wt %, 6-10 wt %, 6-8 wt %, 8-24 wt %, 8-20 wt %, 8-18 wt %, 8-16 wt %, 8-14 wt %, 8-12 wt %, 8-10 wt %, 10-24 wt %, 10-20 wt %, 10-18 wt %, 10-16 wt %, 10-14 wt %, 10-12 wt %, 12-24 wt %, 12-23 wt %, 12-20 wt %, 12-18 wt %, 12-16 wt %, 12-14 wt %, 14-24 wt %, 14-20 wt %, 14-18 wt %, 14-16 wt %, 16-24 wt %, 16-20 wt %, 16-18 wt %, 18-24 wt %, 18-22 wt % and 20-24 wt %.

For Formula (5), the range of "2-16" for variables "a", "b", "d", "f" and "g" independently includes all ranges in between, such as, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16. The range of "50-98 wt %" for variable "c" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "1-25 wt %" for variables "e" and "h" includes all ranges in between, such as, but not limited to, 1-24 wt %, 1-23 wt %, 1-22 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-24 wt %, 4-20 wt %, 4-18 wt %, 4-16 wt %, 4-14 wt %, 4-12 wt %, 4-10 wt %, 4-8 wt %, 4-6 wt %, 6-24 wt %, 6-20, 6-18 wt %, 6-16 wt %, 6-14 wt %, 6-12 wt %, 6-10 wt %, 6-8 wt %, 8-24 wt %, 8-20 wt %, 8-18 wt %, 8-16 wt %, 8-14 wt %, 8-12 wt %, 8-10 wt %, 10-24 wt %, 10-20 wt %, 10-18 wt %, 10-16 wt %, 10-14 wt %, 10-12 wt %, 12-24 wt %, 12-23 wt %, 12-20 wt %, 12-18 wt %, 12-16 wt %, 12-14 wt %, 14-24 wt %, 14-20 wt %, 14-18 wt %, 14-16 wt %, 16-24 wt %, 16-20 wt %, 16-18 wt %, 18-24 wt %, 18-22 wt % and 20-24 wt %.

For Formula (6), the range of "2-16" for variables "a", "b", "d" and "f" independently includes all ranges in between, such as, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16. The range of "50-98 wt %" for variable "c" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "1-25 wt %" for variables "e" and "g" includes all ranges in between, such as, but not limited to, 1-24 wt %, 1-23 wt %, 1-22 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-24 wt %, 4-20 wt %, 4-18 wt %, 4-16 wt %, 4-14 wt %, 4-12 wt %, 4-10 wt %, 4-8 wt %, 4-6 wt %, 6-24 wt %, 6-20, 6-18 wt %, 6-16 wt %, 6-14 wt %, 6-12 wt %, 6-10 wt %, 6-8 wt %, 8-24 wt %, 8-20 wt %, 8-18 wt %, 8-16 wt %, 8-14 wt %, 8-12 wt %, 8-10 wt %, 10-24 wt %, 10-20 wt %, 10-18 wt %, 10-16 wt %, 10-14 wt %, 10-12 wt %, 12-24 wt %, 12-23 wt %, 12-20 wt %, 12-18 wt %, 12-16 wt %, 12-14 wt %, 14-24 wt %, 14-20 wt %, 14-18 wt %, 14-16 wt %, 16-24 wt %, 16-20 wt %, 16-18 wt %, 18-24 wt %, 18-22 wt % and 20-24 wt %.

For Formula (7), the range of "2-16" for variables "a", "b", "d" and "f" independently includes all ranges in between, such as, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16. The range of "50-98 wt %" for variable "c" includes all ranges in between, such as, but not limited to, 50-95 wt %, 50-90 wt %, 50-85 wt %, 50-83 wt %, 50-80 wt %, 60-98 wt %, 60-95 wt %, 60-90 wt %, 60-85 wt %, 60-83 wt %, 60-80 wt %, 65-98 wt %, 65-95 wt %, 65-90 wt %, 65-85 wt %, 65-83 wt %, 65-80 wt %, 70-98 wt %, 70-95 wt %, 70-90 wt %, 70-85 wt %, 70-83 wt %, 70-80 wt %, 75-98 wt %, 75-95 wt %, 75-90 wt %, 75-85 wt %, 75-83 wt %, 75-80 wt %, 80-98 wt %, 80-95 wt %, 80-90 wt %, 80-85 wt % and 90-98 wt %. The range of "1-25 wt %" for variables "e" and "g" independently includes all ranges in between, such as, but not limited to, 1-24 wt %, 1-23 wt %, 1-22 wt %, 1-20 wt %, 1-17 wt %, 1-15 wt %, 1-13 wt %, 1-10 wt %, 1-8 wt %, 1-5 wt %, 2-24 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-24 wt %, 4-20 wt %, 4-18 wt %, 4-16 wt %, 4-14 wt %, 4-12 wt %, 4-10 wt %, 4-8 wt %, 4-6 wt %, 6-24 wt %, 6-20, 6-18 wt %, 6-16 wt %, 6-14 wt %, 6-12 wt %, 6-10 wt %, 6-8 wt %, 8-24 wt %, 8-20 wt %, 8-18 wt %, 8-16 wt %, 8-14 wt %, 8-12 wt %, 8-10 wt %, 10-24 wt %, 10-20 wt %, 10-18 wt %, 10-16 wt %, 10-14 wt %, 10-12 wt %, 12-24 wt %, 12-23 wt %, 12-20 wt %, 12-18 wt %, 12-16 wt %, 12-14 wt %, 14-24 wt %, 14-20 wt %, 14-18 wt %, 14-16 wt %, 16-24 wt %, 16-20 wt %, 16-18 wt %, 18-24 wt %, 18-22 wt % and 20-24 wt %.

In an exemplary embodiment, the terpolymer composition is PA66-s-6-s-6,I or PA66-s-6-s-6,9.

In an exemplary embodiment, the terpolymer composition is PA66-s-$6_6$-s-6,$I_{10}$; PA66-s-$6_{10}$-s-6,$I_4$; PA66-s-$6_{20}$-s-6,$I_8$; PA66-s-$6_7$-s-6,$I_{14}$, PA66-s-$6_{14}$-s-6,$I_{13}$; or PA66-s-$6_{12}$-s-6,$I_{20}$.

In an exemplary embodiment, the terpolymer composition further comprises a copper concentration of greater than 60 ppm and less than 500 ppm, such as greater than 80 and less than 300 ppm, such as greater than 80 and less than 200 ppm. In a particular embodiment, the copper is in the form of copper iodide:potassium iodide in a ratio between 1:4 and 1:10, such as 1:5, such as 1:6, such as 1:7, such as 1:8.

In an aspect of the invention, the terpolymer composition is in the form of a film, where the film comprises, or alternatively, consists of the terpolymer composition.

In an exemplary embodiment, the film is a blown film or a cast film.

In an exemplary embodiment, the film is biaxially oriented.

In an exemplary embodiment, the film (such as a blown film or a cast film and/or a biaxially oriented film) is a multilayer film.

In an exemplary embodiment, the multilayer film comprises at least 2 layers, such as 2 to 12 layers, such as 2 to 11 layers, such as 2 to 10 layers, such as 2 to 9 layers, such as 2 to 8 layers, such as 2 to 7 layers, such as 2 to 5 layers such as 2 to 4 layers, such as 3 to 12 layers, such as 3 to 11 layers, such as 3 to 10 layers, such as 3 to 9 layers, such as 3 to 8 layers, such as 3 to 7 layers, such as 4 to 12 layers, such as 4 to 11 layers, such as 4 to 10 layers, such as 4 to 9 layers, such as 4 to 8 layers, such as 4 to 7 layers, such as 5 to 12 layers, such as 5 to 10 layers, such as 5 to 8 layers, such as 5 to 7 layers, such as 12 layers, such as 11 layers, such as 10 layers, such as 9 layers, such as 8 layers, such as 7 layers, such as 6 layers, such as 5 layers, such as 4 layers, such as 3 layers. In a preferred embodiment, the multilayer film comprises 3 to 10 layers.

In an exemplary embodiment, at least 2 (such as at least 3, such as at least 4, such as at least 5, such as at least 6) of the non-terpolymer-containing layers of the multilayer film comprise, or alternatively, consist of compounds selected from the group consisting of high density polyethylene (HDPE), low density polyethylene (LDPE), linear low density polyethylene (LLDPE), polypropylene (PP), polyethylene terephthalate (PET), nylon (PA), ethylene vinyl alcohol (EVOH) and tie resins (such as, but not limited to, ethylene acrylic acid (EAA), ethylene methacrylic acid (EMAA), ethylene vinyl acetate (EVA), ethylene methacrylate (EMA) and anhydride modified polyethylene (AMP)). In a particular embodiment, at least two of the non-terpolymer layers of the multilayer film are selected from the group consisting of LDPE, tie resins, nylon and EVOH.

The terpolymer composition may comprise a lubricant. In an exemplary embodiment, the terpolymer composition comprises a lubricant selected from the group consisting of aluminum distearate, zinc stearate and calcium stearate at a concentration between 250 and 5,000 ppm, such as between 250 and 3,000 ppm, such as between 250 and 2,000 ppm, such as between 500 and 1,000 ppm, such as between 500 and 800 ppm. Other possible lubricants include, for example, N,N'-ethylene bis-steramide and stearyl erucamide at concentrations between 100 and 5,000 ppm, such as between 200 and 3,000 ppm, such as between 250 and 2,000 ppm, such as between 1,000 and 2,000 ppm, such as between 1,000 and 1,500 ppm.

The terpolymer composition may comprise an anti-block agent. In an exemplary embodiment, the terpolymer composition comprises an anti-block agent selected from the group consisting of N,N'-ethylene bis-steramide, stearyl erucamide and diatomaceous earth.

In an exemplary embodiment, the terpolymer composition further comprises diatomaceous earth (such as, for example, talc, calcium carbonate or silicon dioxide) as an anti-block agent at a concentration between 10 and 1,000 ppm, such as between 10 and 500 ppm, such as between 20 and 800 ppm, such as between 50 and 500 ppm, such as between 100 and 300 ppm.

In an exemplary embodiment, the terpolymer composition is of Formula (1) where "a" is 90 and "c" is 10, and wherein the copolyamide composition has a relative viscosity of 75-230, such as 100-200, such as 100-150, such as 90-150.

In an exemplary embodiment, the terpolymer composition comprises a final copper concentration of greater than 60 ppm and less than 500 ppm and a lubricant selected from the group consisting of aluminum distearate, zinc stearate and calcium stearate at a concentration between 250 and 5,000 ppm, such as between 250 and 3,000 ppm, such as between 250 and 2,000 ppm.

In an exemplary embodiment, the terpolymer composition has a crystallization rate of at least 10× slower, such as 20× slower, such as 30× slower, such as 40× slower, such as 50× slower, such as 60× slower, such as 70× slower, such as 80× slower, such as 90× slower, such as 100× slower, such as >100× slower than a PA66 homopolymer at a temperature of less than or equal to 200° C. and an overall isothermal crystallization behavior slower than that of a PA6 homopolymer and similar to PA66-rich copolymers. Thus, while the terpolymers of the invention maintain high melting points, they exhibit crystallization rates substantially slower than PA6 and PA6-66 copolymers.

In an exemplary embodiment, the terpolymer composition has a semi-crystallization rate less than Nylon6 while possessing a melting point of at least 15° C. greater than Nylon6, such as at least 16° C. greater than Nylon6, such as at least 17° C. greater than Nylon6, such as at least 18° C. greater than Nylon6, such as at least 19° C. greater than Nylon6, such as at least 20° C. greater than Nylon6, such as at least 21° C. greater than Nylon6, such as at least 22° C. greater than Nylon6, such as at least 23° C. greater than Nylon6, such as at least 24° C. greater than Nylon6, such as at least 25° C. greater than Nylon6. In an exemplary embodiment, the terpolymer composition has melting point of 10° C. to 25° C. greater than Nylon6, such as 15° C. to 25° C. greater than Nylon6, such as 20° C. to 25° C. greater than Nylon6.

In an exemplary embodiment, the terpolymer composition has a semi-crystallization rate equal to or less than that of a PA6-66 copolymer while possessing a melting point of at least 15° C. greater than the PA6-66 copolymer melting point, such as at least 16° C. greater than the PA6-66 copolymer melting point, such as at least 17° C. greater than the PA6-66 copolymer melting point, such as at least 18° C. greater than the PA6-66 copolymer melting point, such as at least 19° C. greater than the PA6-66 copolymer melting point, such as at least 20° C. greater than the PA6-66 copolymer melting point, such as at least 21° C. greater than the PA6-66 copolymer melting point, such as at least 22° C. greater than the PA6-66 copolymer melting point, such as at least 23° C. greater than the PA6-66 copolymer melting point, such as at least 24° C. greater than the PA6-66 copolymer melting point, such as at least 25° C. greater than the PA6-66 copolymer melting point. In an exemplary embodiment, the terpolymer composition has a melting point of 10° C. to 25° C. greater than that of a PA6-66 copolymer melting point, such as 15° C. to 25° C. greater than the PA6-66 copolymer melting point, such as 20° C. to 25° C. greater than the PA6-66 copolymer melting point. This feature results in a film with improved thermal resistance without sacrificing processability and aesthetics (i.e., gloss and clarity). The ability to prepare a multilayer film in a single step with a high melting point/high gloss PA66-rich terpolymer of the present invention offers the possibility of replacing conventional lamination structures containing biaxially oriented polyethylene terephthalate at a significantly reduced cost.

In an exemplary embodiment, a PA66 terpolymer composition of the invention has a crystallization temperature that is at least 10° C. less than that of a PA66 copolyamide while having the same melting point. The melting point of the PA66 terpolymer composition is at least 10° C. greater than the melting point for Nylon6, such as at least 11° C. greater than the melting point for Nylon6, such as at least 12° C. greater than the melting point for Nylon6, such as at least 13° C. greater than the melting point for Nylon6. In an exemplary embodiment, a PA66 terpolymer composition has a crystallization temperature that is up to 20° C. less than that of a PA66 copolyamide while possessing the same melting point.

An aspect of the present invention is a terpolymer composition comprising from 70-99 wt % of an AA-BB comonomer repeating unit (such as PA66 or PA6,9) and from 1-30 wt % total of a combination of a lactam (such as caprolactam) comonomer repeating unit and a different AA-BB comonomer repeating unit (such as 6,I or 6,9), where the terpolymer composition has a melting temperature equal to or greater than 220° C.

In an exemplary embodiment, the terpolymer composition has a relative viscosity according to ASTM D789 (9.34) of 45 to 350, such as 80 to 300, such as 85 to 250, such as 90 to 230, such as 95 to 230, such as 100 to 230, such as 100 to 200.

In an exemplary embodiment, the Nylon6,6 is prepared from an aqueous salt of adipic acid and hexamethylene diamine.

In an exemplary embodiment, the terpolymer composition comprises 70-98 wt % of a hexamethylene diamine and adipic acid unit, 1-15 wt % of a lactam comonomer unit, and 1-15 wt % of a AA-BB comonomer unit such as PA6,I, and has a relative viscosity according to ASTM D789 (9.34) of 45 to 350, such as 65 to 300, such as 80 to 250, such as 90 to 230, such as 100 to 230, such as 100 to 200.

In an exemplary embodiment, the lactam repeating unit in the terpolymer is selected from the group consisting of aliphatic lactams such as, but not limited to, butyrolactam, valerolactam, caprolactam, enantiolactam, laurolactam, 12-aminododecanolactam, 2-azacyclononone and 1-aza-2-cyclooctanone.

In a particular embodiment, the lactam repeating unit in the terpolymer is caprolactam or laurolactam.

In an exemplary embodiment, the AA-BB repeating unit in the terpolymer is selected from the product prepared from a dicarboxylic acid and a diamine and includes, but is not limited to, PA6,9; PA6,10; PA6,12; PA6,18; PA9,6; and PA10,6.

In an exemplary embodiment, the dicarboxylic acid (di-acid) in the terpolymer is an aliphatic dicarboxylic acid selected from the group consisting of 2,2-dimethyl-glutaric acid (HOOC—C(CH$_3$)$_2$—COOH); 2,4,4-trimethyl-adipic acid (HOOC—CH(CH$_3$)—CH$_2$—C(CH$_3$)$_2$—COOH); pimelic acid (HOOC—(CH$_2$)$_5$—COOH); suberic acid (HOOC—(CH$_2$)$_6$—COOH); azelaic acid (HOOC—(CH$_2$)$_7$—COOH); sebacic acid (HOOC—(CH$_2$)$_8$—COOH); undecanedioic acid (HOOC—(CH$_2$)$_9$—COOH); dodecanedioic acid (HOOC—(CH$_2$)$_{10}$—COOH); brassylic acid (HOOC—(CH$_2$)$_{11}$—COOH); tetradecanedioic acid (HOOC—(CH$_2$)$_{12}$—COOH); hexadecanedioic acid (HOOC—(CH$_2$)$_{14}$—COOH); octadecanedioic acid (HOOC—(CH$_2$)$_{16}$—COOH), 1-3-cyclohexane dicarboxylic acid and includes anhydrides of any of the aforementioned dicarboxylic acids.

In an exemplary embodiment, adipic acid, azelaic acid, sebacic acid, undecanedioic acid, and tetradecanedioic acid are preferred dicarboxylic acids.

In an exemplary embodiment, the dicarboxylic acid or anhydride is an aromatic dicarboxylic acid or anhydride selected from the group consisting of isophthalic acid; orthophthalic acid; phthalic anhydride; and non-linear naphthalene dicarboxylic acids (such as, for example, 2,7-naphthalene dicarboxylic acid; 2,3-naphthalene dicarboxylic acid; 1,4-naphthalene dicarboxylic acid; and 1,8-naphthalene dicarboxylic acid).

In an exemplary embodiment, isophthalic acid is a preferred aromatic dicarboxylic acid in the terpolymer.

In an exemplary embodiment, the diamine is selected from the group consisting of 2-methyl-1,5-diaminopentane; 2,4,4-trimethyl-1,6-hexamethylenediamine; 1-8-diaminooctane; 2-methyl-1,8-diaminooctane; 1,9-nonanediamine; 5-methyl-1,9-nonanediamine; 1,10-diaminodecane; 1,11-diaminoundecane; 1,12-diaminododecane; 1,13-diaminotridecane; 1,14-diaminotetradecane; 1,16-diaminohexadecane; 1,3-phenylenedimethanamine; and 1,18-diaminooctadecane.

In an exemplary embodiment, 2-methyl-1,5-diaminopentane; 1,9-nonanediamine; and 1,11-diaminoundecane are preferred diamines.

In an exemplary embodiment, the terpolymer composition comprises 84 wt % of PA66 repeating units, 6 wt % of PA6 repeating units, and 10 wt % PA6,I repeating units in a PA66-s-6-s-6,I statistical terpolymer, where the 6,6; 6; and 6,I units are statistically reacted together and distributed in the backbone of the linear aliphatic terpolymer, having a relative viscosity of 45 to 350, such as 100 to 200 and a maximum crystallization temperature of 185° C. In a particular embodiment, the terpolymer composition further comprises a final copper concentration of greater than 60 ppm in the form of copper iodide:potassium iodide in a 1:8 weight ratio, a lubricant selected from the group consisting of aluminum distearate, zinc stearate and calcium stearate at a concentration between 250 and 5,000 ppm and a melting point of approximately 245° C.

In an exemplary embodiment, the terpolymer composition comprises 72 wt % of PA66 repeating units, 20 wt % of PA6 repeating units, and 8 wt % PA6,I repeating units in a PA66-s-6-s-6,I statistical terpolymer, where the 6,6; 6; and 6,I units are statistically reacted together and distributed in the backbone of the linear aliphatic copolyamide, having a relative viscosity of 45 to 350, such as 100 to 200 and a maximum crystallization temperature of 135° C. In a particular embodiment, the terpolymer composition further comprises a final copper concentration of greater than 60 ppm in the form of copper iodide:potassium iodide in a 1:8 weight ratio, a lubricant selected from the group consisting of aluminum distearate, zinc stearate and calcium stearate at a concentration between 250 and 5,000 ppm and a melting point of approximately 220° C.

In an exemplary embodiment, the terpolymer composition comprises a final copper concentration of greater than 60 ppm and less than 500 ppm (such as between 70 and 400 ppm, such as between 70 and 300 ppm, such as between 85 and 200 ppm) and a lubricant selected from the group consisting of aluminum distearate, zinc stearate and calcium stearate at a concentration between 250 and 5,000 ppm (such as between 300 and 3,000 ppm, such as between 350 and 2,000 ppm, such as between 350 and 1,500 ppm).

In an exemplary embodiment, the terpolymer composition has a crystallization rate of at least 20× slower than that of a PA66 homopolymer at a temperature of less than or equal to 200° C. and a crystallization rate of 2× slower than Nylon6.

In an exemplary embodiment, the terpolymer composition has a crystallization rate of at least 100× slower than that of a PA66 homopolymer at a temperature of less than or equal to 200° C.

In an exemplary embodiment, the terpolymer composition has a semi-crystallization rate less than that of Nylon 6 while possessing a melting point of at least 15° C. greater than that of Nylon 6.

In an exemplary embodiment, the terpolymer composition has a semi-crystallization rate substantially similar to PA6-s-66$_{15}$ while have a melting of at least 20° C. higher.

In an exemplary embodiment, the terpolymer composition comprises Formula (2) where "a" is 82-87%, "d" is 5-8%, and "f" is 8-10%, and wherein the terpolymer composition has a relative viscosity of 70-230.

In an exemplary embodiment, the terpolymer composition comprises 80 wt % of PA66 units, 12 wt % of PA6, and 8 wt % PA6,9 units in a PA66-s-6-s-6,9 statistical terpolymer having a relative viscosity of 60 to 365, a melting point of approximately 230-250° C. and a maximum crystallization temperature of 170° C.

In an exemplary embodiment, the terpolymer composition comprises 84 wt % of PA66 units, 6 wt % of PA6 units, and 10 wt % of PA6,I in a PA66-s-6-s-6,I statistical terpolymer having a relative viscosity of 60 to 365, a melting point of approximately 235-255° C. and a maximum crystallization temperature of 185° C.

In an exemplary embodiment, the terpolymer composition comprises 70 wt % of PA66 units, 15 wt % of PA6,10 units, and 15 wt % PA6 units in a PA66-s-6-s-6,10 statistical terpolymer having a relative viscosity of 60 to 365.

BRIEF DESCRIPTION OF THE DRAWINGS

The following figures are merely representative of particular embodiments of the present invention and are not intended to otherwise limit the scope of the invention as described herein.

DETAILED DESCRIPTION OF THE INVENTION

Process for Synthesizing Terpolymers

Figure 1:
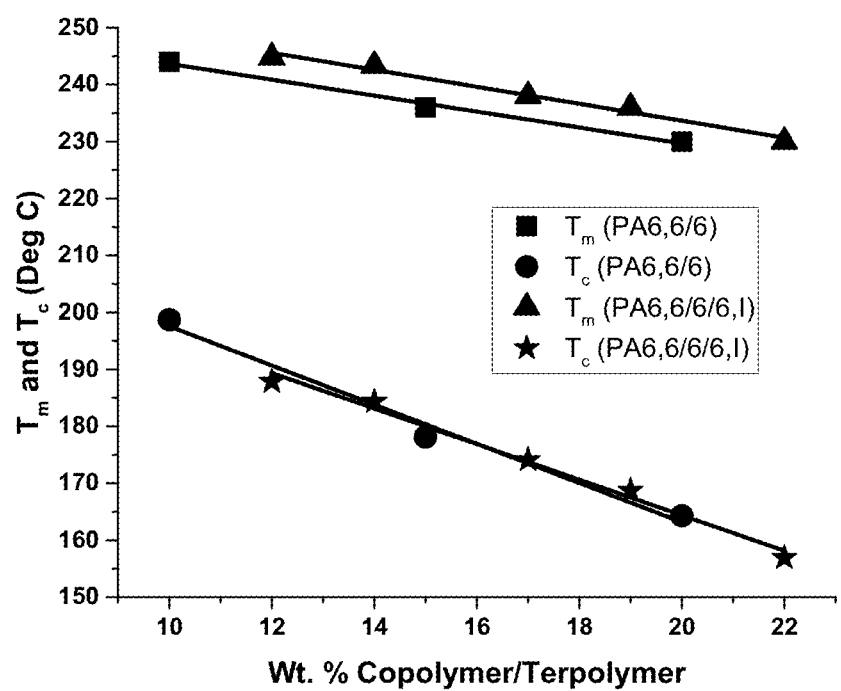
FIG. 1 illustrates a graph comparing copolymers (PA6,6-6) copolymers and terpolymers (PA6,6-6-6,I) with respect to melting point (T$_m$) and crystallization temperature (T$_a$). Incorporation of 6,I content was observed to provide unique, unexpected and advantageous results in that the melting point was maintained at low levels (<5%) of incorporation of 6,I while the T$_c$ was significantly reduced. From a final article perspective (film or injection molded part), this outcome provided an enhanced surface finish/gloss without sacrificing the melting point required for selected applications. Further, the low levels of 6,I incorporation were observed to beneficially reduce the crystallization rate (i.e., more stable bubbles and a clearer film).

In an exemplary embodiment, the terpolymers of the present invention comprise (i) a repeating comonomer AA-BB unit, such as a 1:1 adipic acid-hexamethylene diamine unit (PA66), in combination with (ii) a repeating comonomer AB unit from a lactam, such as caprolactam (PA6), and (iii) a different repeating comonomer AA-BB unit, such as PA6,I, to yield a PA66-s-6-6,I terpolymer composition. In other exemplary embodiments, the terpolymers of the present invention comprise (i) a repeating comonomer AA-BB unit of a linear aliphatic dicarboxylic acids/diamine such as azelaic acid-hexamethylene diamine (PA6,9) in combination with (ii) a repeating comonomer AB unit from a lactam such as caprolactam (PA6), and (iii) a different repeating comonomer AA-BB unit such as PA6,I or PA6,10 to yield a terpolymer composition such as PA6,9-s-6-s-6,I or PA6,9-s-6-s-6,10. In other exemplary embodiments, the terpolymer can be comprised solely of three different repeating comonomer AA-BB units such as PA66, PA6,10, and PA6,I to yield a terpolymer composition such as PA66-s-6,10-s-6,I.

In a particular embodiment, a phosphorous-containing catalyst is added prior to the initial polymerization step. Suitable phosphorous catalysts include, but are not limited to, phosphorous acid; phosphonic acid; alkyl- and aryl-substituted phosphonic acids; hypophosphorous acid; alkyl-, aryl- and alkyl-/aryl-substituted phosphinic acids; and phosphoric acid. Esters and salts of these phosphorous-containing acids are also suitable for addition and include, but are not limited to, alkyl-, aryl- and alkyl-/aryl-esters, metal salts, ammonium salts, and ammonium alkyl salts.

Polymerization of the terpolymers of the invention may be carried out according to conventional continuous or batchwise operating conditions utilized for the polymerization of polyamides such as Nylon6,6. (see, e.g., M. Kohan, Nylon Plastics Handbook, 1995; and G. Odian, Principles of Polymerization, 4th Edition, 2004).

Such a polymerization process may include one or more of: (a) heating the blend with stirring; (b) maintaining the blend under a suitable pressure and temperature for a given period of time, with removal of water vapor via a suitable device; followed by (c) decompressing and holding at a temperature above the melting point of the blend for a given period of time, either under an inert atmosphere (e.g. nitrogen) or under vacuum, in order to continue polymerization by removal of the water by-product that is formed.

At the end of the polymerization process, the terpolymer is cooled, typically with water, and extruded, typically in the form of rods. These rods are then typically converted into pellets.

The pellets are typically subjected to solid state polymerization (SSP) under an inert atmosphere and elevated temperatures. Suitable temperatures for SSP include temperatures above the glass transition temperature of the terpolymer and temperatures below the melting temperature of the terpolymer. In an exemplary embodiment, suitable temperature ranges for solid state polymerization are between about 160 and 220° C., such as between about 180 and 200° C. After the polymerization is complete, various additives may optionally be added to the terpolymer pellets depending on the anticipated use. The pellets may also be blended with additives or polyamide pellets containing additives prior to packaging and transport, Lubricants The terpolymer compositions may optionally contain processing aides in the form of common lubricants. Non-limiting examples of lubricants include stearates (e.g., aluminum distearate, zinc stearate and calcium stearate), N,N' ethylene bis-stearamide and stearyl erucamide. Aluminum distearate and N,N' ethylene bisstearamide are examples of preferred lubricants.

Anti-Block Agents

The terpolymer compositions may also optionally include anti-block agents for film production to prevent film-to-film sticking when the film is wound tightly onto a roll. Typically, these agents are added to lower surface energy or to create nano-level bumps that reduce the coefficient of friction of the film surface. Inorganic solids, usually in the form of diatomaceous earth, represent one class of materials that may be added to the terpolymer composition. Non-limiting examples of these inorganic solids include calcium carbonate, silicon dioxide, magnesium silicate, sodium silicate, aluminum silicate and aluminum potassium silicate. Low surface energy organic materials may also be used. Non-limiting examples include N,N'-ethylene bis-stearamide, stearyl erucamide, glycerol monostearate, zinc stearate, aluminum distearate, and calcium stearate. N,N'-ethylene bis-stearamide and silicon dioxide are examples of preferred anti-block agents.

Nucleating Agents

The terpolymer compositions may also optionally contain a nucleating agent to further improve their clarity and/or their oxygen barrier properties. Typically, these agents are insoluble, high melting point materials that provide a surface for crystallite initiation. By incorporating a nucleating agent, more crystals are initiated, which are smaller in nature. More crystallites and/or a higher % crystallinity corresponds to increased reinforcement/higher tensile strength and a more tortuous path for oxygen flux (which increases the barrier properties). Smaller crystallites decrease light scattering which corresponds to improved clarity. Non-limiting examples of these agents include calcium fluoride, calcium carbonate, talc and Nylon 2,2.

Anti-Oxidants and Heat Stabilizers

The terpolymer compositions may also optionally include organic anti-oxidants in the form of (i) hindered phenols such as, but not limited to, Irganox® 1010, Irganox® 1076 and Irganox® 1098; (ii) organic phosphites such as, but not limited to, Irgafos® 168 and Ultranox® 626; (iii) aromatic amines; (iv) metal salts from Groups IB, IIB, III, and IV of the periodic table; and (v) metal halides of alkali and alkaline earth metals. Copper iodide (CuI) and potassium iodide (KI) are preferred heat stabilizers, and in an exemplary embodiment are present together in a ratio of 1/10, such as 1/8, such as 1/6.

The terpolymers compositions of the present invention, such as Nylon6,6-rich terpolymer compositions, exhibit desirable properties for a broad range of film applications. Nylon is well known for its use in films due to its high strength, puncture resistance, aroma barrier, and good oxygen barrier properties. In meat and cheese packaging, nylon is used as a component in a multilayer film to deliver the aforementioned properties. In multi-layer films, nylon is also a key material for thermo-forming, given its high melting point and strength maintenance (particularly important where the packaging becomes thin upon drawing the film into a three dimensional shape). In the conventional art, PA 6,6-based materials are not utilized in thermoforming applications due to their rapid crystallization. Thus, the reduced crystallization rate of the Nylon6,6-based terpolymer compositions of the present invention is both unexpected and highly advantageous in addressing the unmet needs of the food industry. The high melting point of Nylon 6,6-based polyamides makes them useful in boil-in-bag applications (i.e., poultry, ribs, etc.). The terpolymer compositions of the present invention, even more so than, for example, PA66-copolyamides, exhibit the desirable ability to draw/orient to an even higher degree or exhibit an improved ability to draw at lower temperatures.

Industrial film applications chiefly include films that are employed for structural components that are subjected to high temperatures. For example, composite materials are often cured in a nylon bag inside an autoclave. Additionally, in sterilization applications, the higher melting point associated with Nylon 6,6-based materials inhibits film sagging (i.e., maintains dimension stability at elevated temperatures). In an exemplary embodiment, the nylon component is a key factor in the observed high melting temperature/dimensional stability at elevated temperatures. The terpolymers of the invention, such as the Nylon6,6-based materials, bring significant value to this application in view of the increased film softness which allows for more intimate contact of the film with the substrate which eliminates oxygen bubbles and also desirably creates a smooth surface to the cured part. Biaxially-oriented polyamide (BOPA) is also a useful material, given its high tensile strength and added oxygen barrier and is often used in retort or stand up pouches and lidding (see, e.g., "The Opportunity for Polyamide in Film", PCI Films Consulting Limited, 2015). Nylon6,6 does not possess the ability to be bi-axially oriented due to its rapid crystallization rate which inhibits its stretching upon initial film formation. In contrast, the Nylon6,6-based terpolymers of the present invention are highly suitable for entry into the BOPA market. In an exemplary embodiment, the terpolymers improve processability in blown, oriented mono- or multi-layer lines (referred to as multi-bubble technology, such as the Triple Bubble technology described in Kuhne, http://kuhne-group-.com/index.php?menuid=31). These technologies are critical for applications such as tough barrier shrink films that are used to package premium bone-in meats. The terpolymers of the present invention advantageously exhibit (1) the ability to orient or thermo-form in a broad temperature range and to high draw ratios (>3.5×), (2) high % shrink back (particularly important for intimate contact with meat), (3) preferred aesthetics such as gloss and clarity at desirable melting temperatures for use as an outer film layer in a multi-layer structure, a combination of good package processability (i.e., heat sealing strength and rate) and high consumer package appeal, (4) an acceptable balance between puncture and tear resistance, and (5) low moisture absorption and a high oxygen/aroma barrier.

EXAMPLES

Exemplary films were prepared from: PA6690-s-610; PA6684-s-66-s-6,$I_{10}$; PA6672-s-620-s-6,$9_8$; PA66-s-6-s-6,I; PA6; PA6$_{85}$-s-66$_{15}$; and PA66$_{72}$-s-6$_{20}$-s-6,$I_8$.

Example 1. Preparation of PA6672-s-620-s-6,Is

Approximately 1,222 g of a PA66 salt (representing 72 wt % in the final terpolymer) comprising equimolar amounts of hexamethylene diamine (HMD) and adipic acid at a 56% concentration in water and 185 g of a PA6,I salt (representing 8 wt % in the final terpolymer) comprising of equimolar amounts of HMD and isophthalic acid (IPA) were combined and poured into a 2,000 ml glass beaker containing a stir bar and the beaker was placed on top of a heating plate set to 60° C. to prevent precipitation of any salts from the solution. Approximately 160 g of solid caprolactam (representing 20 wt % in the final terpolymer) was added to the heated salt solution. The solution was then allowed to stir until all solids were dissolved. An anti-foaming agent, a catalyst and/or additional HMD were added as needed and the reaction mixture allowed to stir until completely dissolved. The solution was then transferred into an autoclave (volume 2 L) equipped with a heating jacket. Polymerization was carried out in 5 cycles, where the $1^{st}$ cycle was an evaporation cycle, where the solution was heated above the boiling point of water under pressure at 33 psi (18 psig) concentrating the salt solution until the temperature reached 147° C. In the $2^{nd}$ cycle, the pressure was increased to 265 psia (250 psig) and the temperature was increased to 243° C. In the $3^{rd}$ cycle, the pressure was reduced slowly over a 25-minute span. The polymerization was allowed to continue for 35 minutes in the $4^{th}$ cycle at a temperature above the melting point. In the $5^{th}$ cycle, molten nylon was extruded as a strand from the bottom of the reactor, quenched in a water bath and then pelletized using a pelletizer with a rotating chopper blade. The nylon pellet sample (about 800 grams) was then subjected to a solid state polymerization (SSP) procedure. The SSP was carried out on pellets in a glass jar inside of an oven. The jar was fitted with a nitrogen wand and a thermocouple that extended from the lid down into the pellets and there was a shorter tube that allowed the nitrogen to exit. The SSP reaction was conducted at 180° C. for 3 hours with a nitrogen flow of 30% of 3.62 SCFM.

Determination of Melting and Crystallization Temperatures

Melting and crystallization behavior were determined via differential scanning calorimetry using a heating and cooling rate of 20° C. per minute against an empty reference pan. Approximately 5-10 mg of sample were heated at 20° C. per minute to 300° C. followed by cooling to 0° C. Melting temperatures were determined from the middle of the endothermic peak during heating (i.e., the peak appeared between 200° C. and 270° C. and was dependent on the terpolymer composition) and crystallization temperatures were determined from the middle of the exothermic peak during cooling (i.e., the peak appeared between 140° C. and 230° C. and was dependent on the terpolymer composition).

Determination of Semi-Crystallization Times

Semi-crystallization time versus temperature was performed by isothermal differential scanning calorimetry, where the initial heat history of the polyamide (PA66 and PA6) and copolyamide (PA66-s-6) pellets was erased by heating to above the melting point followed by rapid cooling (greater than 200° C./min) to a specific temperature (such as, but not limited to a range of 100-240° C.). Semi-crystallization time was recorded as the time required to achieve a peak crystallization exothermic transition at each specific temperature. It was observed that the crystallization rate increased as semi-crystallization time decreased. This technique proved to be effective to provide a systematic comparison of crystallization time or rate versus temperature for various thermoplastics. As described herein, it was specifically used to compare the semi-crystallization time of polyamides and the terpolymers.

Isothermal crystallization studies were performed using a differential scanning calorimeter of the power compensation design with separate low-mass furnaces for sample and reference, such as a Perkin-Elmer model Pyris One DSC equipped with a mechanical refrigeration device capable of −90° C. operation. Samples were either 3 to 5 mg in weight, encapsulated in TA Instruments crimped aluminum pans weighing about 20 mg or alternatively, 1 to 2 mg in weight, encapsulated in Perkin-Elmer HyperDSC™ aluminum pans weighing approximately 8 mg. Specimens were cut from pellets using a razor blade to provide thin, flat pieces. The purge gas was dry nitrogen. The test program consisted of heating the specimen from 25° C. to 305° C., holding for five minutes at 305° C., cooling at 200° C./minute to the target isothermal temperature, and holding there until the recrystallization exotherm was completed.

Quantitative Determination of Monomer Exudation at Processing

Monomer exudation under processing conditions was correlated by generating monomer formation versus time plots using a high temperature sublimation technique through gas chromatography (GC) or liquid chromatography mass spectroscopy (LC MS). Samples of polyamides and terpolymers were heated at a constant temperature analogous to typical processing temperatures and monomer evolution and accumulation were measured versus time to determine a weight/time of monomer formation.

End Groups

The terpolymer compositions of the present invention typically exhibit a delta end group (i.e., carboxylic acid ends-amine ends or amine ends-carboxylic acid ends) value of 1-50 micro equivalents/gram, such as 5-30 micro equivalents/gram, such as 5-15 micro equivalents/gram). Amine end groups were observed to range from 5-79 micro-equivalents/gram, such as from 10-45 microequivalents/gram, such as from 15-35 micro equivalents/gram).

Example 2. Film Preparation

Films of polyamides, copolyamides and terpolymers were prepared by melting through a single screw extruder at temperatures between 230° C. and 300° C. Cast films were prepared by extruding through a slip die and rolling onto a chilled roll through winding. Film thickness was adjusted by adjusting winding speeds and adjusting the die gap. Blown films were prepared by extruding through a circular die and blowing up through an air ring and winding into a final roll. Film thickness was controlled by adjusting the die gap, extrusion speed, stretch ratio (both machine and traverse), and by controlling the air velocity.

Multilayer blown film was prepared by using a single layer of Nylon within a seven-layer line that consisted of seven separate extruders that feed into a stacked die to result in several multi-layer film multilayer film structures containing one to multiple layers of the polyamide resin of the present invention. In an exemplary embodiment, the components of a coextruded blown film line included: a resin feed system; extruders; a coextrusion die; an air ring; an internal pressure control for adjusting bubble diameter; a collapsing frame; a take up or haul off roll which sets the machine direction draw; a treatment system; and a winder.

The design features that are important in producing quality film at a competitive price include: an efficient and properly sized resin handling and feed system; an efficient screw design that provides a quality melt with: uniform, efficient temperature control, stable pressure; and at a high rate; an optimized die that provides good layer control and thickness uniformity, where the die is designed for ease of maintenance and durability; air rings that provide excellent cooling control and uniformity; an automated web handling system for improved efficiency and reduced change over times; modular design features for product changeovers; and integrated control systems that are intuitive, operator friendly, and that keep the process parameters on target. Detailed multi-blown film processes are described in, for example, H. F. Giles Jr. et al., *Extrusion: The Definitive Processing Guide and Handbook*, William Andrew Inc., Norwich, N.Y., (2005); and J. R. Wagner, Jr., *Multilayer Flexible Packaging*, Elsevier, (2010).

To determine critical characteristics of the film produced, several important process parameters were collected and studies and observations made. One key parameter is blow up ratio and draw ratio. The draw ratio in the Machine Direction (MD) is characterized by the draw down ratio (DDR), which is defined as the haul off speed divided by the polymer melt velocity as it exits the die. The blow-up ratio (BUR) characterizes the draw ratio in the Transverse Direction (TD) or hoop dimension. BUR is defined as the final bubble diameter divided by the die diameter. In addition, frost line height and process time are important parameters too. Process time, in the blown film process, is defined as the time it takes the polymer to begin to freeze once it exits the die. It is proportional to the frost line height and inversely related to haul-off speed. A key to stabilizing the bubble when preparing film with varying structures is Internal Bubble stability or control and that is controlled separately within the control systems utilized.

For 7-layer (i.e., 7 different polymer layers) film studies, which included two to three polyamide layers, multiple structures were studied, ranging from symmetrical (i.e., the left and right sides from center are balanced) to asymmetrical (i.e., imbalanced left and right sides from center). Selected examples of different structures are shown in Table 1 below, illustrating the process parameters monitored.

TABLE 1

|  | A (Inner) | B | C | D | E | F | G (Outer) |
|---|---|---|---|---|---|---|---|
| TYPE | LDPE | Tie Layer | Polyamide | EVOH | Polyamide | Tie Layer | Polyamide |
| DENSITY | 0.919 | 0.920 | 1.130 | 1.200 | 1.130 | 0.920 | 1.130 |
| M.I. | 0.3 | 1.0 | 1.0 | 1.0 | 1.0 | 1.0 | 1.0 |
| Layer % | 15.0 | 15.0 | 15.0 | 10.0 | 15.0 | 15.0 | 15.0 |
| Estimated Rate, lb/hr | 39.7 | 39.7 | 48.8 | 34.5 | 48.8 | 39.7 | 48.8 |
| Estimated Mass % | 13.2% | 13.2% | 16.3% | 11.5% | 16.3% | 13.2% | 16.3% |
| Pump Rate, lb/hr/rpm | 1.30 | 0.54 | 0.67 | 0.68 | 0.71 | 0.57 | 1.1 |
| Estimated Screw, rpm | 30.5 | 73.6 | 72.8 | 50.8 | 68.7 | 69.7 | 44.3 |
| Zone 1 Barrel Temp, ° F. | 350 | 350 | 440 | 325 | 440 | 350 | 440 |
| Zone 2 Barrel Temp, ° F. | 430 | 430 | 520 | 420 | 520 | 430 | 520 |
| Zone 3 Barrel Temp, ° F. | 410 | 410 | 520 | 410 | 520 | 410 | 520 |
| Zone 4, Barrel Temp, ° F. | 410 | 410 | 500 | 410 | 500 | 420 | 520 |
| Zone 5, Barrel Temp, ° F. | 410 |  |  |  |  |  | 520 |
| Screen Changer | 420 | 400 | 500 | 420 | 500 | 420 | 535 |
| Adaptor | 420 | 400 | 500 | 430 | 500 | 420 | 535 |
| Die Zone Temp, ° F. | 430 | 430 | 480 | 430 | 480 | 430 | 480 |
| Top Die, ° F. | 510 |  |  |  |  |  |  |
| Inner Mandrel, ° F. | 510 |  |  |  |  |  |  |
| Air Ring Supply, ° F. | 45 |  |  |  |  |  |  |
| IBC Air Supply, ° F. | 45 |  |  |  |  |  |  |

LDPE = low-density polyethylene;
EVOH = ethylene vinyl alcohol;
Polyamide = a nylon (includes copolymers and the terpolymers of the invention)

Internal bubble stability was found to be sensitive to control in structures where the induced internal air speed was minimized to maintain the stability of the bubble. Frost line is defined as the height at which the bubble transforms from completely transparent to slightly hazy (due to polymer crystallization). An example of a multilayer structure is viewed in Table 1 above.

Relative Viscosity Determination

Relative viscosities were performed according to ASTM D789 (9.34) at a concentration of 10 wt % in formic acid (Brookfield Rheometry). The relative viscosity is a measure of the increase in viscosity from the polymer relative to the solvent. The dissolved solution was placed in a temperature bath at 25° C. for at least one hour before measurement. Before weighing, polymer samples were dried for 20 minutes at 93° C.±4° C. to remove traces of moisture and were cooled in a desiccator. An automated device dosed in the correct weight of formic acid based on the dried sample weight. Glass capillary viscometers and an automated testing device were used. The rheometer determines viscosity by measuring the force required to turn a spindle in the solution at a specific rate.

Film Testing

Mechanical properties were evaluated via tensile testing to provide tensile strength, modulus, and % elongation to break, Elmendorf tear resistance, and dart drop to depict puncture resistance properties. Film clarity was quantified according to ASTM D1003 using a Byk Gardner, Haze-Guard Plus instrument. Oxygen transmission rates were determined via ASTM D3985 using a coulometric detector. Below is a list of the conventional testing techniques and ASTM methods used.

| Test Type | Test Method Used |
|---|---|
| Oxygen Transmission Rate (OTR) | ASTM D3985 |
| Elmendorf Tear | ASTM D1922 |
| Dart Drop (f50) | ASTM D1709, A |
| Puncture Force | ASTM F1306 |
| Tensile/Elongation | ASTM D882 |

-continued

| Test Type | Test Method Used |
|---|---|
| 1% Secant Modulus | ASTM D882 |
| % Clarity | ASTM D1003 |

Table 2 displays comparisons between PA66-s-6, PA66-s-6-s-6,I, and PA66-s-6-s-6,10 formulations. As shown in the table, the addition of a third monomer unexpectedly resulted in a reduction of the crystallization temperature and % crystallinity. The application benefits of this phenomenon is reflected in the property data.

TABLE 2

| Target Weight % Modification | Total Mole % Modification | Melting Temperature (° C.) | Crystallization Temperature (° C.) | % Crystallinity |
|---|---|---|---|---|
| 12% 6 | 21.4% | 244 | 179 | — |
| 15% 6,I | 14.0% | 229 | 151 | — |
| 10% 6, 4% 6,I | 21.6% | 239 | 175 | — |
| 8% 6, 8% 6,I | 21.8% | 241 | 176 | — |
| 6% 6, 10% 6,I | 20.2% | 243 | 176 | — |
| 4% 6, 12% 6,I | 18.5% | 243 | 181.3 | — |
| 6% 6, 12% 6,I | 21.9% | 239 | 172 | — |
| 8% 6, 8% 6,10 | 21.1% | 243 | 175 | — |
| 6% 6, 10% 6,10 | 19.2% | 244 | 179 | — |
| 24% 6 | 38.7% | 220 | 149 | — |
| 24% 6, 4% 6,I | 41.8% | 218 | 140 | — |
| 22% 6, 6% 6,I | 40.8% | 219 | 136 | — |
| 20% 6, 8% 6,I | 39.7% | 220 | 138 | — |
| 16% 6, 10% 6,I | 35.8% | 225 | 147 | — |
| 12% 6, 16% 6,I | 35.0% | 224 | 140 | — |
| 15% 6, 15% 6,I | 38.5% | 216 | 124 | — |
| 10% 6, 20% 6,I | 35.4% | 219 | 122 | — |
| 20% 6, 8% 6,10 | 39.2% | 219 | 140.8 | — |
| 15% 6, 15% 6,10 | 37.5% | 218 | 141.2 | — |
| 28% 6 | 43.8% | 208 | 133 | — |

Mechanical and aesthetic data obtained for monolayer films comparing PA66-s-6 copolyamides, PA66 terpolymers, PA6, and PA6-s-66 copolymers showed that the terpolymers unexpectedly exhibited a desirable combination of high tear strength, elongation to break, dart drop, and high gloss and clarity.

Mechanical and aesthetic data obtained for blown, multilayer films comparing PA66-s-6 copolyamides, PA66 terpolymers, PA6, and PA6-s-66 copolymers showed that the terpolymers unexpectedly exhibited a desirable combination of high tear strength, elongation to break, dart drop, and high gloss and clarity while preserving the benefits of a Nylon layer melting point >220° C.

Film processing data data obtained for blown-oriented multilayer films comparing PA66-s-6 copolyamides, PA66 terpolymers, PA6 and PA6-s-66 copolymers showed that the terpolymers unexpectedly exhibited the broadest processing window which is desirable for promoting ease of orientation and superior end use properties.

Barrier and moisture absorption data obtained for blown-oriented multilayer films comparing PA66-s-6 copolyamides, PA66 terpolymers, PA6 and PA6-s-66 copolymers demonstrated that the terpolymers of the invention unexpectedly exhibited the lowest moisture absorption and highest oxygen/aroma barrier which is useful for enhancing the shelf-life of a product that will be packaged using these films.

Results and Discussion

It was unexpectedly observed that incorporation of two separate monomer units into a PA66-rich unit resulted in a statistical terpolymer that desirably exhibited a slow crystallization rate while maintaining a high melting point >220° C. This combination of properties was not observed with conventional polymers, including the PA66-rich copolymers described in WO 2017/058857. The PA66-rich copolymers are known to achieve a crystallization rate that is up to 5× slower than that of Nylon6, which approaches the crystallization rate of Nylon6-s-66 copolymers. However, the PA66-rich terpolymers of the present invention unexpectedly exhibited crystallization rates of up to 10× slower than the crystallization rate of Nylon6, which is even slower than the rates observed for Nylon6-s-66 copolymers. This significant further reduction in crystallization rate (and temperature) results in a composition with highly superior processing and end use properties, such as, but not limited to, gloss and toughness.

FIG. 1 compares the melting point ($T_m$) and crystallization temperature ($T_c$) for PA66-s-6 copolyamide to that of a PA66-s-6-s-6,I terpolymer. It is both notable and unexpected that through the incorporation of low levels of 6,I into a PA66-s-6 copolymer, the resulting PA66-s-6-s-6,I terpolymer exhibited a melting point that was unchanged from the copolyamide while in contrast, the crystallization temperature was drastically reduced. As an example, a PA66-s-6 copolyamide with 10 wt % PA6 content exhibited a $T_m$=244° C. and a $T_c$=199° C. Incorporation into the copolyamide of 2 wt % and 4 wt % 6,I, respectively, in two different preparations, while maintaining the amount of PA6 in each formulation to a constant 10 wt %, resulted in two exemplary terpolymers of the present invention with a melting point that remained at 244° C. while the crystallization temperature significantly decreased in each preparation to 188° C. and 184° C., respectively. This phenomenon was also observed at a base PA6 content of 15 wt % and 20 wt %, with incorporation of up to 4 wt % PA6,I into the copolyamide formulation. The increased gap of $T_m$-$T_c$, which is directly associated with a desirably increased processing window, was also observed to be directly in line with reduced crystallization rate.

Figure 2:
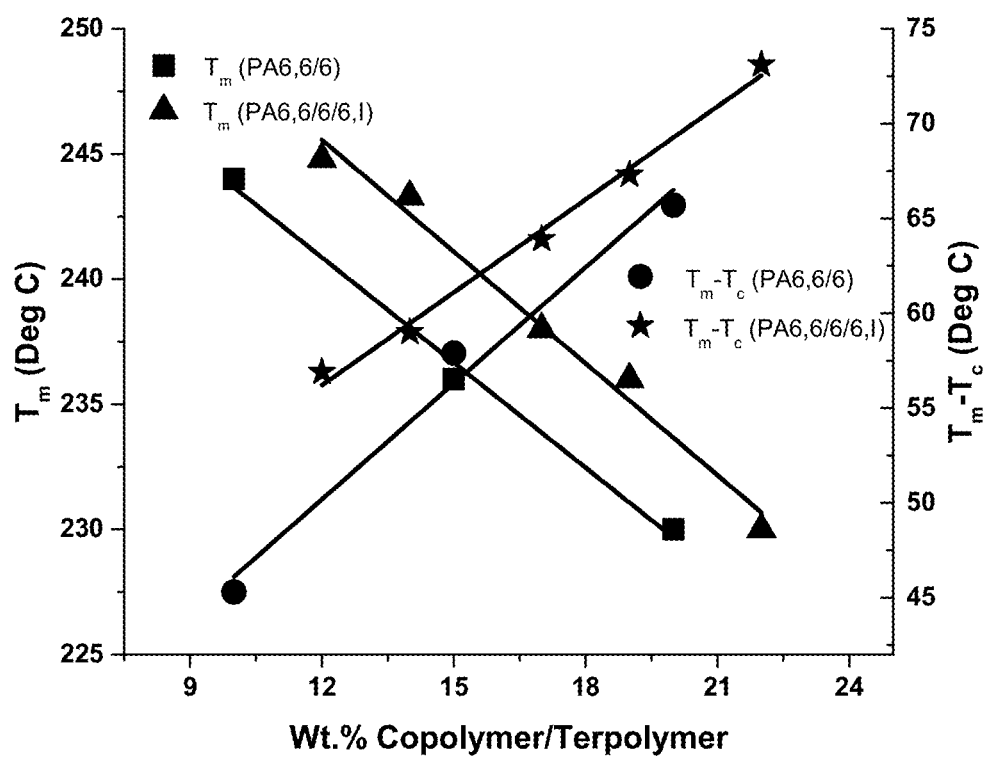
FIG. 2 illustrates a graph similar to FIG. 1 with further various 6 and 6,I modifications. The same advantages were observed to exist when incorporating 6,I to (1) maintain a higher melting point while (2) more aggressively decreasing the crystallization temperature/rate. Compositions shown in the graph are highlighted in a table provided herein. In particular, melting point (squares and triangles) is plotted on the left-side ordinate and $T_m$-$T_c$ (circles and stars) is plotted on the right-side ordinate vs wt % copolymer and terpolymer for PA66-s-6 and PA66-s-6-s-6,I formulations. The graph provides evidence that transitioning from a PA66-s-6 copolymer to a PA66-s-6-6,I terpolymer resulted in a maintained melting point while increasing the $T_m$-$T_c$ gap through a significant reduction in the crystallization temperature.
Figure 3:
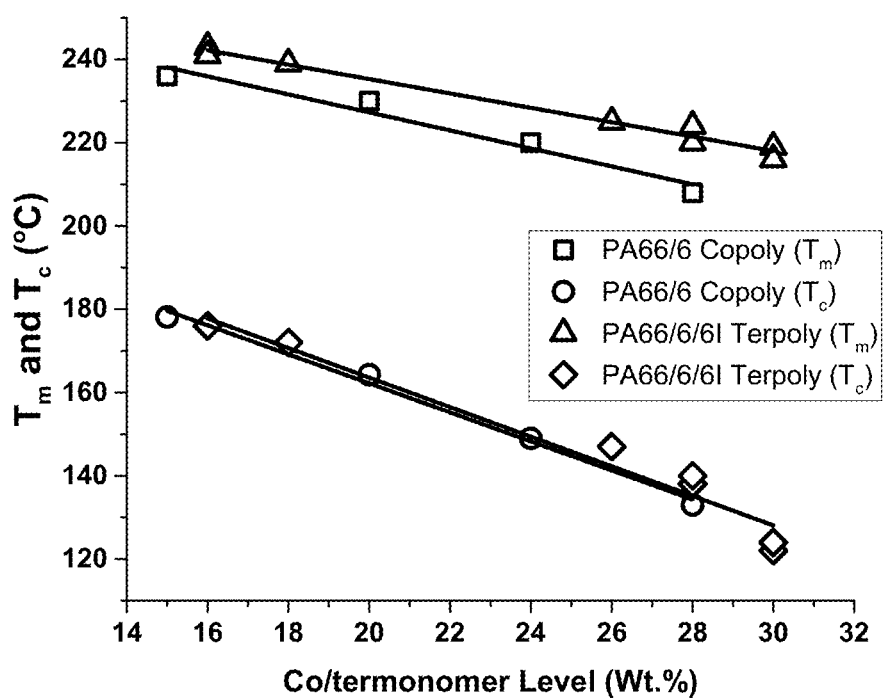
FIG. 3 illustrates additional various 6 and 6,I modifications at similar levels, where the same advantages observed in FIG. 2 are observed when incorporating 6,I for the purpose of (1) maintaining a higher melting point while (2) significantly decreasing the crystallization temperature/rate.
Figure 4:
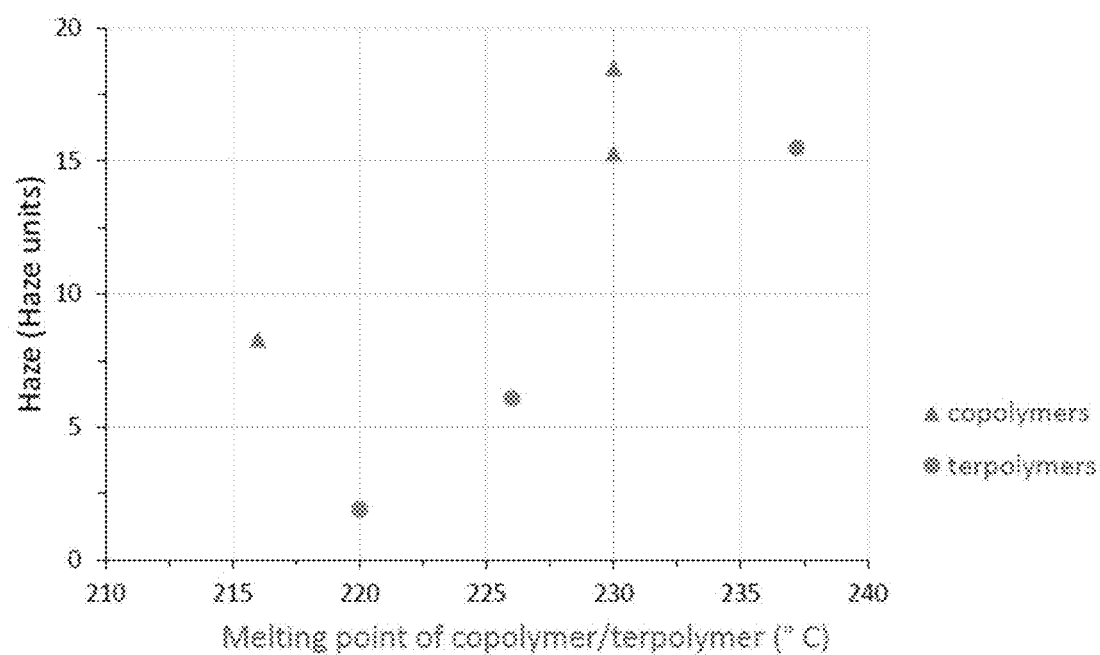
FIG. 4 illustrates that terpolymers of the invention (filled circles) produce films which exhibit lower haze while retaining high melting points when compared to copolymers (filled triangles).
Figure 5:
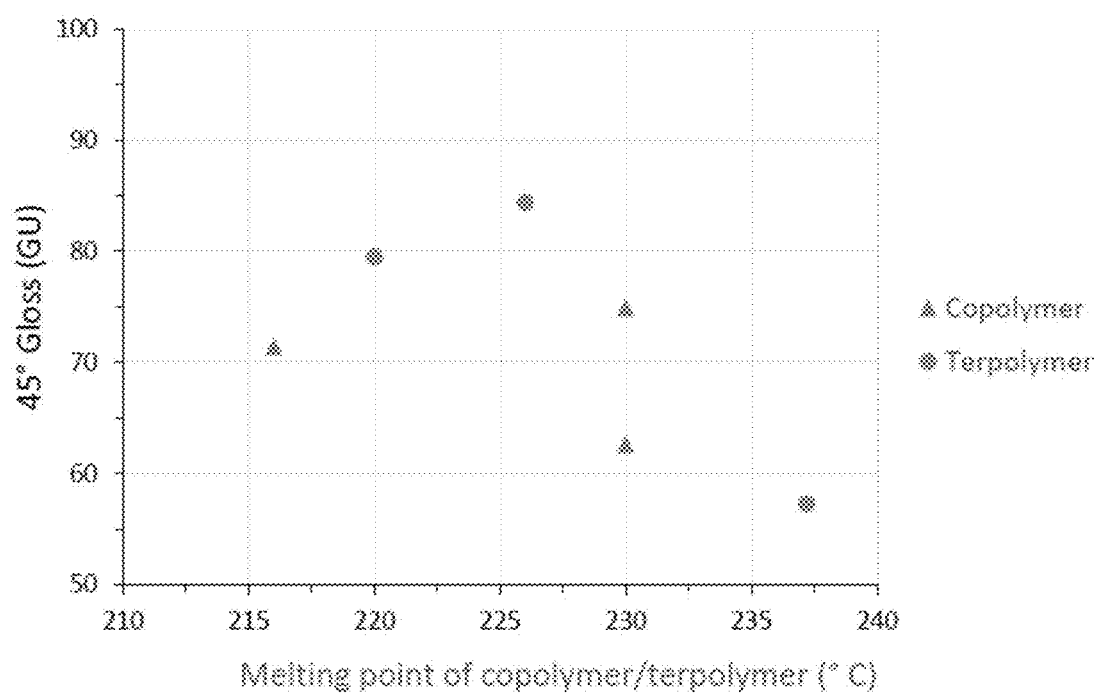
FIG. 5 illustrates that terpolymers of the invention (filled circles) result in higher gloss values in monolayer films while retaining high melting points when compared to copolymers (filled triangles).
Figure 6:
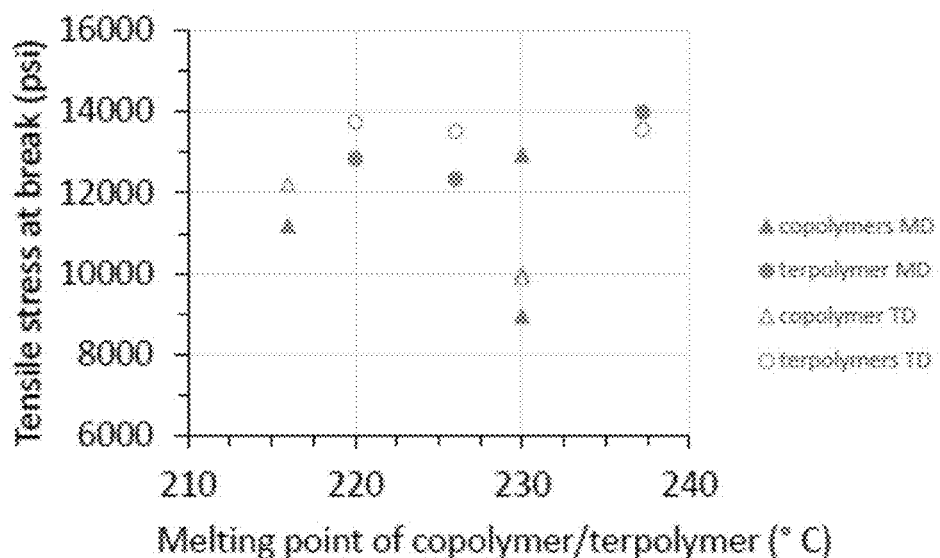
FIG. 6 illustrates that terpolymers of the invention (open circles) exhibited on an average about 27% higher tensile stress at break in the transverse direction (TD) when compared to copolymers (open triangles) while retaining the high melting points (monolayer films) and also that the terpolymers on an average exhibited 15% higher tensile strain at break when compared to copolymers while retaining the high melting points.
Figure 6:
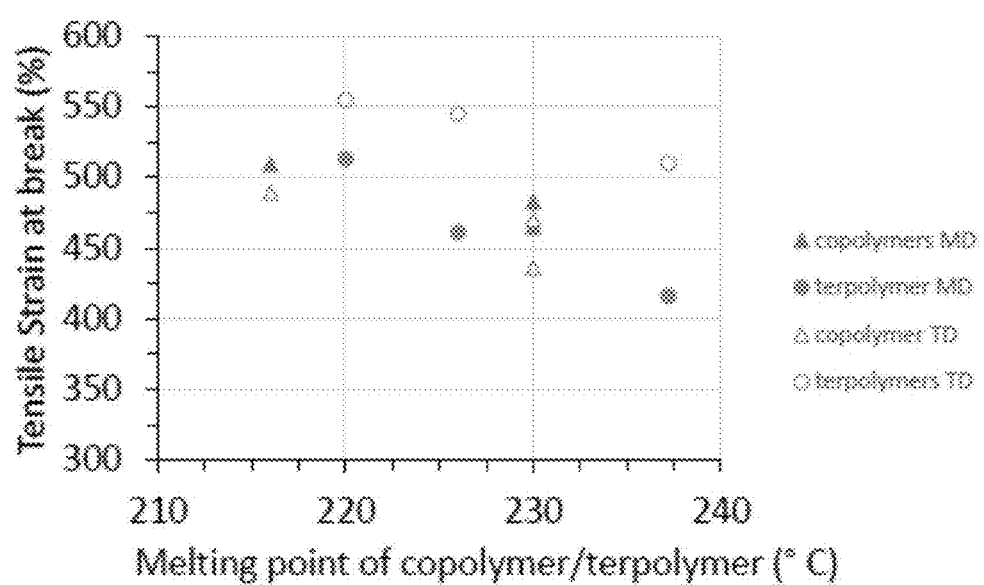

The phenomenon of only slight variations, if any, of melting point in combination with an increased $T_m$-$T_c$ gap is depicted in FIG. 2. When comparing copolyamide PA66-s-6 to terpolymer PA66-s-6-s-6,I at the same melting points, the PA66-s-6-s-6,I formulations achieved an 8° C. to 15° C. increase in $T_m$-$T_c$. The scope of this phenomenon was further evaluated in FIG. 3, where additional variations of PA66-s-6-s-6,I were compared to PA66-s-6 formulations. In particular, FIG. 3 shows that the selection of the amounts of 66 and 6,I in the terpolymer affected the melting point and crystallization temperature, but the increase in $T_m$-$T_c$ compared to the copolyamide PA66-s-6 formulations was maintained, which is evidence of the robustness of this approach in altering crystallization behavior to satisfy a process/performance need. If employing only a copolymer approach, such as modification with only PA6 or 6,I, the combination of high melting point and low crystallization temperatures with a maintained level of percent crystallinity cannot be achieved, unlike the terpolymers of the present invention. For example, when observing the PA66/6 copolymers (with open squares □ for $T^m$ and open circles ○ for $T_c$), the crystallization temperatures can be significantly depressed, but it is at the cost of lower melting points (observed at a 28% concentration where $T_m$=208° C. and $T_c$=133° C.). However, when comparing this phenomenon to particular PA66-s-6-s-6,I terpolymer formulae, a desirably low $T_c$ can be achieved while maintaining a $T_m$ advantage. For example, two formulae of PA66-s-6-s-6,I, one with 22 wt % 6 and 6 wt % 6,I and another with 10 wt % 6 and 20 wt % 6,1, were observed to maintain a $T_m$=219 (both formulae) ° C. and a $T_c$=136° C. and 122° C., respectively. FIG. 4 shows that the terpolymers of the invention (filled circles ●) produce films which exhibit lower haze while retaining high melting points when compared to copolymers (filled triangles ▲). FIG. 5 shows that the terpolymers of the invention (filled circles ●) resulted in higher gloss values in monolayer films while retaining high melting points when compared to copolymers (filled triangles ▲). FIG. 6 shows that terpolymers (open circles ○) exhibited on an average about 27% higher tensile stress at break in the transverse direction (TD) when compared to copolymers (open triangles △) while retaining the high melting points (monolayer films). In addition, the terpolymers on an average exhibited 15% higher tensile strain at break when compared to copolymers while retaining the high melting points.

All patents/publications cited herein are incorporated by reference in their entireties.

The invention claimed is:
1. A terpolymer comprising:
  50-98 wt % of a first repeating AA-BB comonomer unit selected from PA6,6;
  1-25 wt % of a second repeating AA-BB comonomer unit selected from PA6,9; PA6,10; and PA6,12; and
  1-25 wt % of a third repeating AA-BB comonomer unit, wherein the first, second, and third repeating AA-BB comonomer units are all different;
  wherein the terpolymer has a relative viscosity according to ASTM D789 (9.34) of 45 to 350 and a melting point greater than 215° C. and the terpolymer is of Formula (2):

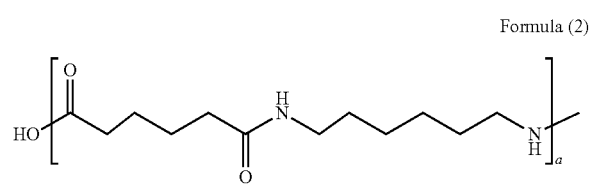

Formula (2)

-continued

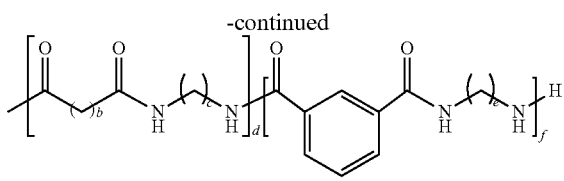

wherein:
a=50-98 wt %;
b=7, 8, or 10;
c=6;
d=1-25 wt %;
e=2-16; and
f=1-25 wt %.

2. The terpolymer according to claim 1, wherein the terpolymer has a relative viscosity according to ASTM D789 (9.34) of 70 to 230.

3. The terpolymer according to claim 1, wherein the second repeating AA-BB comonomer unit is PA6,9.

4. The terpolymer according to claim 1, wherein the second repeating AA-BB comonomer unit is PA6,10.

5. The terpolymer according to claim 1, wherein the second repeating AA-BB comonomer unit is PA6,12.

6. The terpolymer according to claim 1, wherein the third repeating AA-BB comonomer unit is PA6,I.

7. The terpolymer according to claim 1, wherein:
a=82-87 wt %,
d=5-8% wt %, and
f=8-10 wt %; and the terpolymer has a relative viscosity according to ASTM D789 (9.34) of 70 to 230.

8. A composition comprising the terpolymer according to claim 1, further comprising greater than 60 ppm and less than 500 ppm copper.

9. A composition comprising the terpolymer according to claim 1, further comprising a lubricant.

10. A composition comprising the terpolymer according to claim 1, further comprising an anti-block agent.

11. A film comprising the terpolymer according to claim 1.

12. The film according to claim 11, where the film is a blown film.

13. The film according to claim 12, where the blown film is a multilayer film.

14. The multilayer film according to claim 13, where the film comprises 3 to 10 layers.

15. The multilayer film according to claim 14, where at least two of the 3 to 10 layers comprise non-terpolymer layers selected from the group consisting of low density polyethylene (LDPE), ethylene acrylic acid copolymer (EAA), ethylene methacrylic acid copolymer (EMAA), ethylene vinyl acetate copolymer (EVA), ethylene methacrylate copolymer (EMA), anhydride modified polyethylene (AMP), nylon (PA) and ethylene vinyl alcohol copolymer (EVOH).

16. The film according to claim 11, where the film is a cast film.

17. The film according to claim 11, where the film is biaxially oriented.

18. The film according to claim 17, where the biaxially oriented film is a multilayer film.

19. The multilayer film according to claim 18, where the film comprises 3 to 10 layers.

20. The multilayer film according to claim 19, where at least two of the 3 to 10 layers comprise non-terpolymer layers selected from the group consisting of low density polyethylene (LDPE), ethylene acrylic acid copolymer (EAA), ethylene methacrylic acid copolymer (EMAA), ethylene vinyl acetate copolymer (EVA), ethylene methacrylate copolymer (EMA), anhydride modified polyethylene (AMP), nylon (PA) and ethylene vinyl alcohol copolymer (EVOH).

* * * * *